(12) United States Patent
Hikmet et al.

(10) Patent No.: US 11,718,017 B2
(45) Date of Patent: Aug. 8, 2023

(54) PRINTING METHOD FOR FDM PRINTING SMOOTH SURFACES OF ITEMS

(71) Applicant: SIGNIFY HOLDING B.V., Eindhoven (NL)

(72) Inventors: Rifat Ata Mustafa Hikmet, Eindhoven (NL); Paulus Albertus Van Hal, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/272,617

(22) PCT Filed: Aug. 30, 2019

(86) PCT No.: PCT/EP2019/073225
§ 371 (c)(1),
(2) Date: Mar. 1, 2021

(87) PCT Pub. No.: WO2020/048889
PCT Pub. Date: Mar. 12, 2020

(65) Prior Publication Data
US 2021/0339463 A1    Nov. 4, 2021

(30) Foreign Application Priority Data

Sep. 3, 2018  (EP) ..................................... 18192205

(51) Int. Cl.
*B29C 64/118*   (2017.01)
*B33Y 10/00*    (2015.01)
(Continued)

(52) U.S. Cl.
CPC .......... *B29C 64/118* (2017.08); *B29C 64/209* (2017.08); *B29C 64/245* (2017.08);
(Continued)

(58) Field of Classification Search
CPC ................. B29C 64/118; B29C 64/209; B29C 64/245; B29C 64/336; B29C 71/0009;
(Continued)

(56) References Cited

U.S. PATENT DOCUMENTS

2006/0158456 A1\* 7/2006 Zinniel .................. B33Y 70/00
345/589
2017/0066187 A1   3/2017 Mark et al.
(Continued)

FOREIGN PATENT DOCUMENTS

CA    2992226 A1    7/2018
EP    3363619 A1    8/2018
(Continued)

*Primary Examiner* — Joseph S Del Sole
*Assistant Examiner* — John Robitaille

(57) ABSTRACT

The invention provides method for producing a 3D item (1) by means of fused deposition modelling, the method comprising: —a 3D printing stage comprising layer-wise depositing an extrudate (321) comprising 3D printable material (201), wherein during at least part of the 3D printing stage the extrudate (321) comprises a core-shell extrudate (1321) comprising a core (2321) comprising a core material (2011), and a shell (2322) comprising a shell material (2012), to provide the 3D item (1) comprising 3D printed material (202), wherein the 3D item (1) comprises a plurality of layers (322) of 3D printed material (202), wherein one or more of layers (322) comprises one or more core-shell layer parts (3322), wherein each of the core-shell layer parts (3322) comprises a layer core (3321) comprising the core material (2011), and a layer shell (3322) comprising the shell material (2012), wherein the 3D item (1) has an item surface (252) defined by at least part of the 3D printed material (202); —an exposure stage comprising exposing at least part of the item surface (252) to a liquid (402), wherein the core material (2011) has core material solubility SC1 for the
(Continued)

liquid (402) and wherein the shell material (2012) has a shell material solubility SS1 for the liquid (402), wherein SC1<SS2.

9 Claims, 7 Drawing Sheets

(51) Int. Cl.
| | | |
|---|---|---|
| *B33Y 40/00* | (2020.01) | |
| *B33Y 70/00* | (2020.01) | |
| *B29C 64/245* | (2017.01) | |
| *B29C 64/209* | (2017.01) | |
| *B29C 64/336* | (2017.01) | |
| *B33Y 80/00* | (2015.01) | |
| *B29K 101/12* | (2006.01) | |

(52) U.S. Cl.
CPC ............ *B29C 64/336* (2017.08); *B33Y 10/00* (2014.12); *B33Y 40/00* (2014.12); *B33Y 70/00* (2014.12); *B29K 2101/12* (2013.01); *B29K 2995/0073* (2013.01); *B33Y 80/00* (2014.12)

(58) Field of Classification Search
CPC ............ B29K 2995/0073; B33Y 10/00; B33Y 40/00; B33Y 70/00; B33Y 80/00; D01F 8/04
See application file for complete search history.

(56) References Cited

U.S. PATENT DOCUMENTS

| | | | |
|---|---|---|---|
| 2017/0210063 A1* | 7/2017 | Andres | ............... B29C 65/4825 |
| 2017/0329266 A1 | 11/2017 | Yago | |
| 2020/0009786 A1* | 1/2020 | Hikmet | ................. B33Y 70/00 |
| 2020/0070402 A1* | 3/2020 | Lewis | ................. D06M 15/507 |
| 2020/0370206 A1* | 11/2020 | Dunn | ........................ D01F 8/14 |

FOREIGN PATENT DOCUMENTS

| | | |
|---|---|---|
| WO | 2015077262 A1 | 5/2015 |
| WO | 2016030164 A1 | 3/2016 |
| WO | 2018015192 A1 | 1/2018 |
| WO | 2018106705 A1 | 6/2018 |

\* cited by examiner

PRINTING METHOD FOR FDM PRINTING SMOOTH SURFACES OF ITEMS

CROSS-REFERENCE TO PRIOR APPLICATIONS

This application is the U.S. National Phase application under 35 U.S.C. § 371 of International Application No. PCT/EP2019/073225, filed on Aug. 30, 2019, which claims the benefit of European Patent Application No. 18192205.5, filed on Sep. 3, 2018. These applications are hereby incorporated by reference herein.

FIELD OF THE INVENTION

The invention relates to a method for manufacturing a 3D (printed) item and to a software product for executing such method. The invention also relates to the 3D (printed) item obtainable with such method. Further, the invention relates to a lighting device including such 3D (printed) item.

BACKGROUND OF THE INVENTION

The use of extruded 3D printer inputs containing layers is known in the art. WO2015/077262, for instance, describes 3D printer inputs including filaments comprising separated layers or sections. These inputs particularly including filaments may be prepared by coextrusion, microlayer coextrusion or multicomponent/fractal coextrusion. These inputs and specifically filaments enable layering or combining different materials simultaneously through one or more nozzles during the so-called 3D printing process. These techniques facilitate smaller layer sizes (milli, micro, and nano) different layer configurations as well as the potential to incorporate materials that would otherwise not be usable in standard 3D printer methods.

WO2018/106705 discloses a 3D printed core-shell filament having an elongated core that is radially surrounded by an outer shell with a barrier layer in between. The elongated core comprises a ductile polymer and the outer shell comprises a stiff polymer having a Young's modulus higher than that of the ductile polymer.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast and can be used for printing complicated object.

FDM printers are relatively fast, low cost and can be used for printing complicated 3D objects. Such printers are used in printing various shapes using various polymers. The technique is also being further developed in the production of LED luminaires and lighting solutions.

Fused Deposition Modelling (FDM) is one of the most frequently used techniques used in producing objects based on additive manufacturing (3-D printing). FDM works on an "additive" principle by laying down plastic material in layers. Because of the nature of the process this in general leads to a rough ribbed surface finish. This may not always be desired, e.g. for decorative reasons, but also for functional reasons, such as reflectivity of the surface, treatability of the surface, etc. Hence, in some applications smooth surfaces are required. For this purpose various post surface treatment methods such as mechanical polishing and solvent treatment can be used.

A heat treatment of the entire 3D printed product may lead to weakening of the product, and thus loss of shape and/or functionality. Solvent or solvent vapor treatment may also be used for obtaining smooth surfaces. In these treatments, the object may e.g. be dipped in a solvent or gets subjected to a solvent vapor. However, the use of such techniques may essentially mainly be successful when massive objects are used. During the treatment solvent molecules penetrate the polymer ("3D printed material") and partially dissolve it. When a thin layer is used it leads to crack formation and or delamination and deformation of the object.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Amongst others, it is herein suggest using a filament having essentially concentric layers or using a printer nozzle and filament feeders so that two kinds of materials come out of the nozzle and form core-shell layers stacked next to each other or on top of each other. Materials can be chosen so that the outer surface is made of a polymer with which is soluble in the solvent which is to be used in the solvent treatment, whereas the core material does not get swollen or dissolved in this polymer. The object printed in this way may have a layer which has an outer surface which can at least partly be dissolved by the solvent while the inner material is not affected by the solvent. Placing the object in a solvent or subjecting it to the solvent vapor makes the outer polymer flow leading to a smooth surface structure while the inner polymer may essentially preserve the mechanical integrity and avoids the structure from cracking and collapsing.

Hence, in a first aspect the invention provides a method for producing a 3D item by means of fused deposition modelling, the method comprising a 3D printing stage and an exposure stage (especially of the 3D printed item obtained in the 3D printing stage). The 3D printing stage comprises layer-wise depositing an extrudate comprising 3D printable material, wherein during at least part of the 3D printing stage the extrudate comprises a core-shell extrudate comprising (i) a core comprising a core material, and (ii) a shell (or "jacket"), comprising a shell material. Thereby, the 3D item may be provided, comprising 3D printed material, wherein the 3D item especially comprises a plurality of layers of 3D printed material, wherein one or more of layers comprises one or more core-shell layer parts, wherein each of the core-shell layer parts comprises a layer core comprising the core material, and a layer shell comprising the shell material, wherein the 3D item has an item surface defined by at least part of the 3D printed material. Further, the exposure stage may especially comprise exposing at least part of the item surface to a liquid, wherein the shell material may dissolve. Hence, especially the core material has core material solubility SC1 for the liquid and the shell material has a shell material solubility SS1 for the liquid, wherein SC1<SS1. In specific embodiments, the core material comprises one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and (semi-crystalline) polyethylene terephthalate (PET). In yet further specific embodiments, the shell material comprises one or more of acrylonitrile butadiene styrene (ABS), poly(methyl methacrylate) (PMMA), polystyrene (PS), and styrene acrylic copolymers (SMMA).

Hence, the invention especially provides a method for producing a 3D item by means of fused deposition modelling, the method comprising:

a 3D printing stage comprising layer-wise depositing an extrudate comprising 3D printable material, wherein during at least part of the 3D printing stage the extrudate comprises a core-shell extrudate comprising a core comprising a core material, and a shell comprising a shell material, to provide the 3D item comprising 3D printed material, wherein the 3D item comprises a plurality of layers of 3D printed material, wherein one or more of layers comprises one or more core-shell layer parts, wherein each of the core-shell layer parts comprises a layer core comprising the core material, and a layer shell comprising the shell material, wherein the 3D item has an item surface defined by at least part of the 3D printed material;

an exposure stage comprising exposing at least part of the item surface to a liquid, wherein the core material has core material solubility SC1 for the liquid and wherein the shell material has a shell material solubility SS1 for the liquid, wherein SC1<SS1, wherein:

the core material comprises one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and (semi-crystalline) polyethylene terephthalate (PET); and the shell material comprises one or more of acrylonitrile butadiene styrene (ABS), poly(methyl methacrylate) (PMMA), polystyrene (PS), and styrene acrylic copolymers (SMMA).

With such method, a 3D printed item may be provided wherein at least part of the item surface may be much smoother than would the surface not have been exposed to the liquid. Further, crack formation and/or delamination may be improved. Without exposure to the liquid, the item surface may have the characteristic ribbed structure such as provided with FDM printed 3D items. However, due to the exposure, the part of the item surface that is exposed to the liquid obtains a smoother surface, with less roughness. Especially part of the shell material may be dissolved by which a smoothening effect of at least part of the item surface may be created. Further, with the present invention the mechanical properties which may especially be provided with the core material may be less effected, or not effected at all, as the core material may not essentially dissolve in the liquid. The aspect of dissolving may also have a time component. Hence, the shell material and core material may be chosen such that within a predetermined time period the part of the item surface that is exposed to the liquid becomes smoother and may reach a desired smoothness, while during that time period the core material is essentially not dissolved. Hence, with such method surface roughness may be diminished from e.g. µm dimensions of the filaments to nm dimensions after heating. Further, with such method relatively easily smoothening may be executed. If desired, the entire item can be exposed to the liquid essentially without loss of shape and/or functionality. Further, with such method, the backbone material which may essentially consist of the core material in each filament may stay essentially unaltered, while the surface is smoothened. Hence, a strong device with a relative smooth surface may be provided.

As indicated above, the method is especially used for producing a 3D item by means of fused deposition modelling (FDM). The method comprises two stages, a 3D printing stage and an exposure stage, wherein the latter is in general later than the former, though there may be some overlap in time in other embodiments (see also below). The method may also comprise one or more further stages, like a heating stage for also smoothening the surface. Hence, there may be a finishing stage comprising an exposure stage to liquid and optionally a heating stage. Instead of the term "finishing stage" also the term "post processing" or similar terms may be applied. Other stages may also be available.

Further, the term "stage" may also refer to a sequence of stages, such as e.g. a sequence of printing stages wherein in between one or more functional components or other components are integrated in or arranged on the thus obtained 3D printed material.

The 3D printing stage comprises layer-wise depositing an extrudate comprising 3D printable material, wherein during at least part of the 3D printing stage the extrudate comprises a core-shell extrudate comprising a core comprising a core material, and a shell comprising a shell material, to provide the 3D item comprising 3D printed material. Hence, the 3D printing process especially provides the 3D item which comprises a plurality of layers of 3D printed material, which are especially formed due to the layer-wise deposition.

As indicated above, during at least part of the 3D printing stage the extrudate comprises a core-shell extrudate. This phrase indicates that during the printing stage also 3D printing may be executed wherein no core-shell extrudate is provided, but an extrudate of a single material, without essential composition differences throughout the cross-section of the extrude (i.e. "normal" 3D printing with a single nozzle). A way to accomplish this may be to stop feeding material to a core part or to a shell part of the printer head, by which from the nozzle as extrudate only a single material may escape and be deposited (see further also below).

The core-shell extrudate may in some embodiments be obtained by using a core-shell filament that is fed to the printer head and leave (at least partially molten) the nozzle of the printer head. In other embodiments, the core shell extrudate is obtained by using a core-shell nozzle, i.e. a nozzle that includes two opening, which, when 3D printable material is forced through the nozzle, provides the core-shell extrudate.

Note that the term "core-shell" may in specific embodiments also indicate a core-shell with a plurality of different shells. For the further explanation of the invention, however, here below essentially only core-shell extrudate or core-shell layer parts are discussed consisting of a core and a (single) shell. In embodiments, the core may consist of a core and one or more shells, which together form the core. This core is at least partially surrounded with the shell. Hence, herein the term "shell" especially refers to the outer layer or set of outer layers (for instance in embodiments when the shell may comprise a plurality of shells).

To provide a core-shell material, a (printer head with a) core-shell nozzle may be applied, as known in the art (see also above).

Hence, during at least part of the 3D printing stage the extrudate comprises a core-shell extrudate. The core-shell extrudate comprises a core comprising a core material, and a shell comprising a shell material.

One or more of layers comprises one or more core-shell layer parts, wherein each of the core-shell layer parts comprises a layer core comprising the core material, and a layer shell comprising the shell material. When the entire layer is printed as core-shell layer, the entire layer can be indicated as core-shell layer part or as core-shell layer. However, when during printing of the layer supply of the core material or of the shell material to the nozzle is (temporarily) terminated, part of the layer will not be of the core-shell type, leading to a layer comprising a core-shell layer part (or parts) (and a non-core-shell part or parts).

Herein, the term "core-shell layer part" is used. This reflects the fact that in embodiments all layers may be core-shell layers, in embodiments part of the total number of layers may be core-shell layers, and in embodiments a part of a layer (or parts of layers) may be of the core-shell type. Hence, in embodiments not all layers may be of the core-shell type, and in other embodiments all layers may be of the core-shell type.

The core-shell layer part may have a length of less than 1 mm to a few mm, or much longer. The thickness and height may essentially be the same as a possible adjacent non-core-shell layer (part), as (in embodiments) the same nozzle may be used to provide core-shell layer (parts) and non-core shell layer parts.

The thus obtained 3D item has an item surface defined by at least part of the 3D printed material. Especially, this item surface is (thus) defined by the shell material.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature $(T_g)$ and/or a melting point $(T_m)$, and the printer head action comprises heating the 3D printable material above the glass transition and if it is a semi-crystalline polymer above the melting temperature. In yet another embodiment, the 3D printable material comprises a (thermoplastic) polymer having a melting point $(T_m)$, and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. Optionally, the 3D printable material comprises a 3D printable material selected from the group consisting of Urea formaldehyde, Polyester resin, Epoxy resin, Melamine formaldehyde, thermoplastic elastomer, etc. Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

As indicated above, the 3D printable material of the shell may differ from the 3D printable material of the core. Hence, in embodiments the core material has a different composition than the shell material. Especially, the core material and the shell material comprise thermoplastic polymers, respectively. Especially, the compositions of the thermoplastic polymers differ. This may be useful for forming good core-shell extrudates (or filaments) and this may allow the shell to dissolve relatively fast, whereas the core is essentially not dissolved.

In specific embodiments, the polymers are incompatible. Polymers which are incompatible cannot be mixed on a molecular level. When mixed together they become phase separated. Hence, the core material may comprise a first polymer and the shell material may comprise a second polymer, wherein the first polymer and the second polymer are not compatible. Therefore, in specific embodiments the core material and the shell material comprise different thermoplastic materials. In embodiments, the core material may comprise a first thermoplastic material and the shell material may comprise a second thermoplastic material that differs from the first thermoplastic material.

As indicated above, there may be differences between solubilities (of the core material and shell material) in the liquid that is used during the liquid exposure stage for smoothening at least part of the surface. Especially, the core material has core material solubility SC1 for the liquid and wherein the shell material has a shell material solubility SS1 for the liquid, wherein SC1<SS1, especially SC1/SS1≤0.5 (such as at room temperature (in general to be considered 20° C.)), like in embodiments in the range of 0.1-0.8.

In specific embodiments, the core material comprises one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and (semi-crystalline) polyethylene terephthalate (PET). Hence, the core material may comprise one or more different thermoplastic materials. As indicated above, in addition, also other materials may be available, like particulate material embedded in the core material.

Further, in specific embodiments, the shell material comprises one or more of acrylonitrile butadiene styrene (ABS), poly(methyl methacrylate) (PMMA), polystyrene (PS), and styrene acrylic copolymers (SMMA). Hence, the shell material may comprise one or more different thermoplastic materials. As indicated above, in addition, also other materials may be available, like particulate material embedded in the core material.

Further, it may be desirable that the materials differ in some (other) respects. In specific embodiments, the core material has a core material viscosity and the shell material has a shell material viscosity, wherein at a temperature above the core glass temperature (Tg1) or core melting temperature Tm the core material viscosity is especially higher. This may allow a good processing during the printing stage. Preferably molecules with shorter chain length are used for the shell. This enables faster flow of the material to obtain smooth surfaces. The melt flow rate, especially as specified by ISO-113 under conditions (300° C.; 1.2 kg), is especially higher than 20 $cm^3/10$ min, more especially higher than 50 $cm^3/10$ min and most especially higher than 100 $cm^3/10$ min. In specific embodiments, the polymeric materials of the core and the shell may be incompatible. This may especially imply that there is essentially no mixing at the interface of the two layers (of core and shell). Bonding between the filaments may especially be provided by the shells.

It may also be useful when the shell material has a lower viscosity. This may facilitate smearing out the shell layer at the surface of the item. Hence, in embodiments the core material has a higher viscosity than the shell material at a temperature where both the core material and the shell material are fluidic. For instance, in specific embodiments the core material has a core dynamic viscosity $\mu 1$ and wherein the shell material has a shell dynamic viscosity $\mu 2$, wherein $\mu 2/\mu 1<0.8$, like in the range of 0.1-0.8.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structures (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one more post processing actions may be executed after removing the printed item from the receiver item. Post processing may include e.g. one or more of polishing, coating, adding a functional component, etc. Post-processing may include smoothening the ribbed structures, which may lead to an essentially smooth surface.

The liquid exposure can be done in different ways. In embodiments, the exposure stage may comprise one or more of providing a hot gas comprising the liquid to the 3D printed material, providing a spray of droplets comprising the liquid to the 3D printed material, washing the 3D printed material with the liquid, and dipping the 3D printed material in the liquid. Optionally, when exposing part of the surface to the liquid, that part may also be exposed to some pressure and/or shear.

Hence, in embodiments the liquid may be applied by one or more of flowing the liquid over at least part of the item surface, spraying the liquid to at least part of the item surface, exposing at least part of the item surface to a vapor comprising the liquid, and dipping at least part of the item surface in the liquid. In embodiments, the term "spraying" may include atomizing.

The exposure to the liquid can be executed after the 3D item has been provided, or after part thereof has been 3D printed. Hence, the exposure stage may take place during printing or after printing or both. Liquid exposure may be done locally, e.g. local exposure of a just printed part, or the liquid exposure may to the entire 3D printed item. When the entire 3D item is subjected to the exposure stage, the exposure stage is of course after the 3D printing stage. Combinations of liquid exposure methods may also be applied. Hence, the printing stage and the exposure stage may in time be combined or may be executed one after the other.

Therefore, in embodiments one or more of the item surface or the liquid during the exposure stage has a temperature of at maximum of 80° C., such as at maximum 50° C., like at maximum 40° C. Especially, the liquid may have a temperature not larger than one of the indicated maximum temperatures.

Suitable liquids are those that have a larger solubility for the shell material than for the core material, such as SC1<SS1, especially SC1/SS1≤0.5. In embodiments, the liquid comprises one or more of acetone and methyl ethyl ketone. These liquids are especially useful as solvent for one or more of ABS, PMMA, PS, or SMMA. The term "liquid" may also refer to a plurality of different liquids. The term "liquid" may refer to a plurality of different solvents. One or more of these may be solvents for the shell material (and essentially not for the core material).

Especially, the exposure stage may lead to a removal of part of the shell material at at least part of the item surface. In general, however, not all shell material at the at least part of the item surface is removed, but a reduction in layer thickness occurs (i.e. especially the layer shell in the width of the respective layer).

As indicated above, the liquid exposure may lead to a relative smooth surface. In specific embodiments, surface roughness below 10 µm, or even below 5 µm, or even below 1 µm may be obtained. Hence, heating may be subject to the roughness reduction. This may e.g. be measured with laser scattering. Hence, in embodiments the method may further comprising heating the 3D printed material until a predetermined average surface roughness (Ra) of a surface of the 3D item is obtained, wherein especially the predetermined average surface roughness (Ra) is equal to or lower than 5 µm for an area of at least 25 mm$^2$, such as at least 100 mm$^2$. In embodiments, the entire external surface of the 3D printed item may have such average surface roughness.

In specific embodiments, the core-shell extrudate has a core diameter (d1) selected from the range of 100-3000 µm and wherein the shell thickness (d2) is selected from the range of 100-2000 µm, especially up to about 1000 µm, such as in the range of 100-500 µm. The core-shell extrudate may be provided and printed as such or may be generated in the printer head, such as with coextrusion printer head. When the core of the extrudate has note an essentially circular cross-section, instead of the core diameter, the largest width may be chosen. This largest width may also be in the range of about 100-3000 µm. The shell thickness may then be defined as the largest shell thickness, which may be in the range of about 100-3000 µm, such as about 100-2000 µm.

Due to the availability of the shell, adhesion between filaments may be affected. Hence, it may be desirable to have the thickness of the shell(s) between the filaments in the 3D printed material relatively thin, and especially thinner than of the 3D printable material (i.e. the material not yet printed).

Therefore, in specific embodiments pressure is applied on the printable material while being deposited on the support or receiver item (i.e. including on 3D printed material on the receiver item). This pressure may especially be applied with the printer head. In this way, (core-shell) extrudate may be printed that have no essentially round cross-sectional shape but a compressed tubular shape, like extended along an axis. Therefore, in specific embodiments during printing pressure is applied to the (core-shell) extrudate to provide a deposited (core-shell) layer part, which in the case of core-shell layers may have in embodiments a deformed core with a first dimension (h1) and a second dimension (w1) perpendicular to each other and perpendicular to a longitudinal axis (A) of the core-shell extrudate, that may especially have a ratio (h1/w1) of less than 1, such as less than 0.9, like less than 0.8, such as in the range of 0.2-0.6. As indicated above, the pressure may be applied with the printer head during depositing of the 3D printable material.

Hence, especially the method provides layers have layer heights (H) and layer widths (W), wherein the layer heights (H) are smaller than the layer widths (W). This may apply to essentially all 3D printed layers (whether or not being of the core-shell type). Especially when printing core-shell extrudate, the method comprises providing during the printing stage the one or more of layers wherein the layer shell has a thickness that varies over a circumference of the layer core, wherein the thickness (d4) of the layer shell in height of a respective layer of the one or more layers is smaller than the thickness (d22) the layer shell in the width of the respective layer. The thickness (d4) of the layer shell in height of a respective layer may even be zero µm at some positions between adjacent layers. Hence, in specific embodiments adjacent layers may be in physical contact with each other (and the core-core distance is essentially zero µm). During the exposure stage, the layer thickness d22 may be reduced. The layer thickness d22 may be considered the largest layer thickness of the shell in the width of the respective layer. The thickness d4 may be considered the largest layer thickness of the shell in the height of the layer. In general, d22>d4, or even d22>>d4.

Hence, in embodiments (the layers have layer heights (H) and layer widths (W)), wherein during the printing stage pressure is applied to the core-shell extrudate on a substrate to provide the layers of 3D printed material on the substrate with layer heights (H) smaller than the layer widths (W). Hence, the shell thickness (d2) of the filament or extrudate may (substantially) be reduced when the extrudate is deposited. Due to the pressure, d4 is reduced when compared to a situation wherein less or no pressure is applied. Further, due to the pressure d22 may be increased relative to a situation wherein less or no pressure is applied, though this is not necessarily the case.

Alternatively or additionally to applying pressure, a specific nozzle geometry may be chosen to facilitate that the thickness of the shell between layers is small and relatively (much) larger at those parts of the layers that are not in contact with an adjacent layer (i.e. the side(s) of the layers).

Hence, in yet a further embodiment the method may further comprise using a printer nozzle, wherein the printer nozzle comprises a core feed nozzle and a shell feed nozzle configured for providing the core-shell extrudate, wherein especially the core feed nozzle has a largest core nozzle width (w11) and a smallest core nozzle width (w12), wherein the shell feed nozzle has a largest shell nozzle width (w21) and a smallest core nozzle width (w22), wherein w21>w22, w21>w11, w21>w12, and w12≥w11. Especially, the nozzles are configured in line with each other, i.e. that a center of the shell feed nozzle and a center of the core feed nozzle are coinciding or configured above each other; in the latter embodiment, a virtual line connecting the centers may be perpendicular to the nozzles. The condition of w21>w22 may thus additionally or alternatively facilitate the formation of the compressed layers and relatively thin shell between the layers. Hence, w21 may also be essentially identical to w22, but in specific embodiments w21>w22. When w21=w22, the shell nozzle is round or square. When w11=w12, the core nozzle is round or square. Especially, the core nozzle may be round ("circular"), and the shell nozzle is oval or rectangular. Note that in such embodiments the shell thickness d2 of the extrudate downstream of the nozzle varies over the core.

Instead of the term "nozzle" also the terms "opening" or "nozzle opening" may be applied.

In embodiments, the largest core nozzle width (w11) is selected from the range of 100-3000 μm. Further, in embodiments the largest shell nozzle width (w21) is selected from the range of 100-3000 μm, such as in the range of 100-2000 μm. In yet further embodiments the largest core nozzle width (w11) is larger than the largest shell nozzle width (w21) (such as oval or rectangular).

When printing with a non-circular shell nozzle, it may still be desirable to apply pressure to the core-shell extrudate on a substrate.

When printing with a non-circular shell nozzle it may be desirable to rotate the nozzle relative to the substrate as otherwise when printing in a direction perpendicular to a former direction leads to some or essentially all of the core-shell structure. Rotation can be done by rotating the printer head or by rotating the substrate or by rotation both. All options are herein included in the phrase "configured rotatable relative" and similar phrases.

Therefore, in specific embodiments the method may further comprise application of a fused deposition modeling 3D printer, comprising (a) the printer nozzle, and (b) a substrate, wherein the fused deposition modeling 3D printer is configured to provide the 3D printable material to the substrate, wherein the nozzle and substrate are configured rotatable relative to each other, and wherein the method further comprises maintaining the nozzle and the substrate in configuration such that the largest core nozzle width (w11) is configured perpendicular to a 3D printing direction during at least part of the printing stage. To this end, the 3D printer software may be adapted to allow control of the printing direction and nozzle-substrate configuration.

A software product when running on a computer may be capable of bringing about the method as described herein. The computer may be functionally coupled to a fused deposition modeling 3D printer or may be comprised by such fused deposition modeling 3D printer. Especially, such software product may be used for maintaining the nozzle and the substrate in configuration such that the largest core nozzle width (w11) is configured perpendicular to a 3D printing direction during at least part of the printing stage.

The herein described method provides 3D printed items. Hence, the invention also provides in a further aspect a 3D printed item obtainable with the herein described method. Especially, the invention provides a 3D item comprising 3D printed material, wherein the 3D item comprises a plurality of layers of 3D printed material, wherein one or more of layers comprise one or more core-shell layer parts, wherein each of the core-shell layer parts comprises a layer core comprising the core material, and a layer shell comprising the shell material, wherein the 3D item has an item surface defined by at least part of the 3D printed material. Especially, the layer shell has a layer thickness (d22) at the item surface, wherein the layer shell has an intermediate layer thickness (d4) between adjacent layers, wherein the layer thickness (d22) is larger than the intermediate layer thickness (d4). As indicated above, the intermediate thickness may in some embodiments be essentially zero lam, leading to physical contact or optionally even admixing, of adjacent layers.

The core material comprises one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and (semi-crystalline) polyethylene terephthalate (PET). The shell material comprises one or more of acrylonitrile butadiene styrene (ABS), poly(methyl methacrylate) (PMMA), polystyrene (PS), and styrene acrylic copolymers (SMMA).

Some specific embodiments in relation to the 3D printing method described above not only relate to the method but also to the 3D printed item. Below, some specific embodiments in relation to the 3D printed item are discussed in more detail.

At least part of a surface of the 3D item has an average surface roughness (Ra) equal to or lower than 5 μm for an area of at least 25 mm$^2$, such as an area of at least 100 mm$^2$. Further, in embodiments the core material has core material solubility SC1 for the liquid and wherein the shell material has a shell material solubility SS1 for the liquid, wherein SC1<SS1, such as SC1/SS1<0.5.

As indicated above, in embodiments the layers of the 3D printed material on the substrate may have layer heights (H) smaller than the layer widths (W). Especially, in embodiments the layer shell has a thickness that varies over a circumference of the layer core, wherein the thickness (d4) of the layer shell in height of a respective layer of the one or more layers is smaller than the thickness (d22) the layer shell in the width of the respective layer. In yet further embodiments, the core material may have a higher viscosity than the shell material at a temperature where both the core material and the shell material are fluidic. For instance, in embodiments the core material has a core dynamic viscosity μ1 and wherein the shell material has a shell dynamic viscosity μ2, wherein μ2/μ1<0.8.

As indicated above, one or more of the core-shell layer parts (of 3D printed material)s have a deformed core with a first dimension (h1) and a second dimension (w) perpendicular to each other and perpendicular to a longitudinal axis (A) of the core-shell layer (of 3D printed material) that have a ratio (h1/w1) of less than 1. Especially, this may apply to at least 50%, such as at least 70% of all layers. Hence, at least 50% over the summed length of the layers has a deformed core. Further, adjacent cores may have a core-core distance (d23) selected from the range of at maximum 200 μm, such as at maximum 100 μm, like at maximum 50 μm, or even smaller, such as at maximum 20 μm. In some embodiments, the core-core distance may be zero. The core-core distance is especially defined as the shortest distance between cores of adjacent layers.

The 3D item as described herein, and as obtainable with the method as described herein, may be substantially any kind of item. The 3D item herein is especially a body, which may be partly hollow or which may be a massive body. The 3D item may be a plate, a shaped article, etc., etc. Specific examples of items that may be created with the present invention and may be the result of the method described herein are e.g. an optical (translucent) filter, a reflector, a light mixing chamber, a collimator, a compound parabolic concentrator, etc.

The thus obtained 3D printed item may be functional per se. For instance, the 3D printed item may be a lens, a collimator, a reflector, etc. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively or additionally, the functional component may comprise a thermal component (e.g. configured to cool or to heat an electrical component). Hence, the functional component may be configured to generate heat or to scavenge heat, etc.

As indicated above, the 3D printed item may be used for different purposes. Amongst others, the 3D printed item may be used in lighting. Hence, in yet a further aspect the invention also provides a lighting device comprising the 3D item as defined herein. Especially, the 3D item may be configured as one or more of at least part of a lighting device housing, a wall of a lighting chamber, and an optical element. As a relative smooth surface may be provided, the 3D printed item may be used as mirror or lens, etc.

Returning to the 3D printing process, a specific 3D printer may be used to provide the 3D printed item described herein, such as a fused deposition modeling 3D printer comprising (a) a printer head comprising a printer nozzle, and (b) a 3D printable material providing device configured to provide 3D printable material to the printer head, wherein the fused deposition modeling 3D printer is configured to provide said 3D printable material to a substrate, wherein the printer nozzle comprises a core feed nozzle and a shell feed nozzle configured for providing the core-shell extrudate, wherein the core feed nozzle has a largest core nozzle width (w11) and a smallest core nozzle width (w12), wherein the shell feed nozzle has a largest shell nozzle width (w21) and a smallest core nozzle width (w22), wherein the fused deposition modeling 3D printer may further comprise a control system (C), wherein the control system (C) is configured to execute the method as defined above.

The control system (C) may be configured to execute the method maintaining the nozzle and the substrate in configuration such that the largest core nozzle width (w11) is configured perpendicular to a 3D printing direction during at least part of the printing stage.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to the substrate, wherein the printer nozzle comprises a core feed nozzle and a shell feed nozzle configured for providing the core-shell extrudate, wherein the core feed nozzle has a largest core nozzle width (w11) and a smallest core nozzle width (w12), wherein the shell feed nozzle has a largest shell nozzle width (w21) and a smallest core nozzle width (w22), wherein in embodiments the fused deposition modeling 3D printer further comprises a control system (C), wherein the control system (C) is configured to execute the method as defined above.

The control system (C) may be configured to execute the method maintaining the nozzle and the substrate in configuration such that the largest core nozzle width (w11) is configured perpendicular to a 3D printing direction during at least part of the printing stage.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
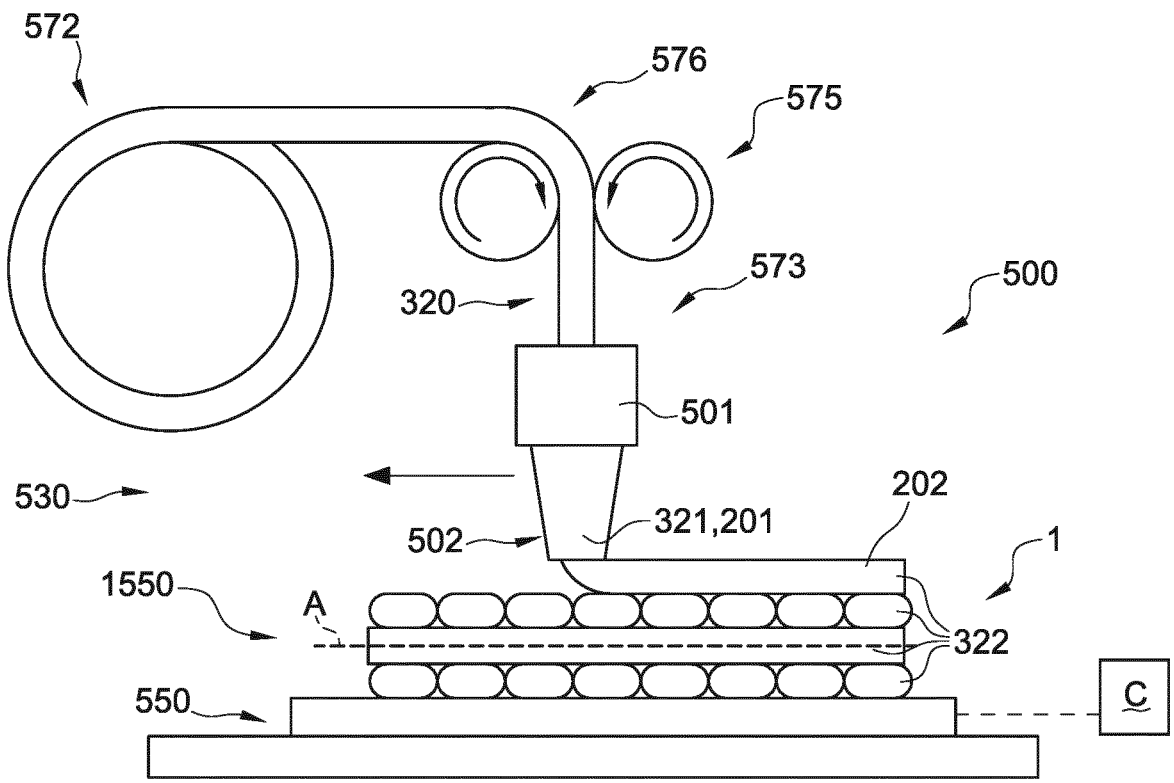
FIGS. 1a-1c schematically depict some general aspects of a 3D printer and of a 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 321 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 1 by layer-wise depositing on a receiver item 550, which may in embodiments at least temporarily be cooled, a plurality of filaments 321 wherein each filament 310 comprises 3D printable material 201, such as having a melting point $T_m$. The 3D printable material 201 may be deposited on a substrate 1550 (during the printing stage).

The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in a filament 321 downstream of the printer nozzle which becomes a layer 322 on the receiver item or on already deposited printed material. In general, the diameter of the filament 321 downstream of the nozzle is reduced relative to the diameter of the filament 322 upstream of the printer head. Hence, the printer nozzle is sometimes (also) indicated as extruder nozzle. Arranging layer 322 by layer 322 and/or layer 322*t* on layer 322, a 3D item 1 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
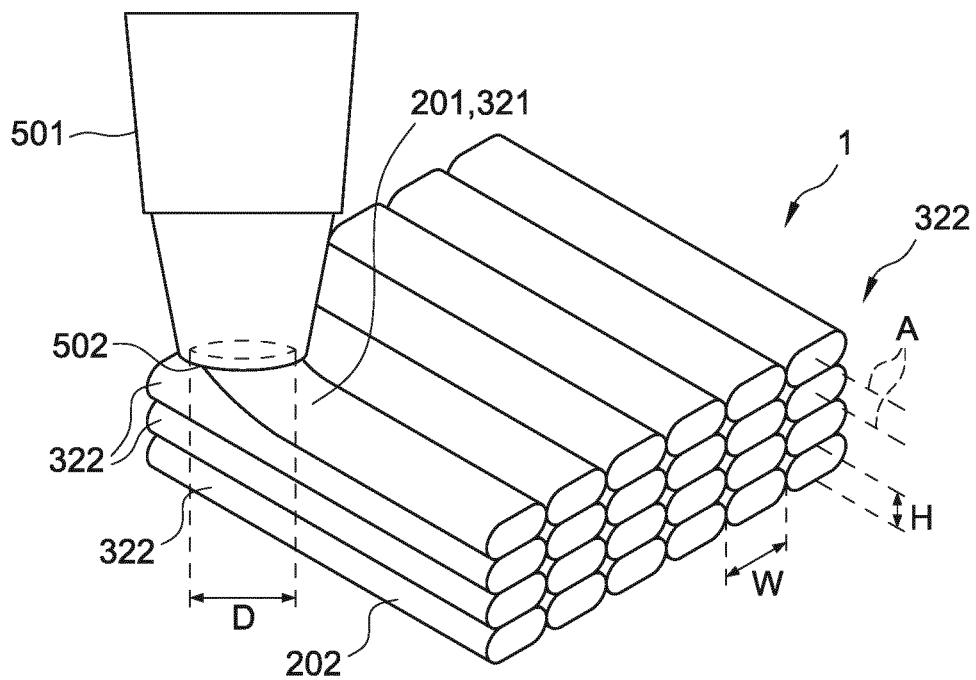

FIG. 1*b* schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1*a*-1*b* schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1*a*-1*b*, the first or second printable material or the first or second printed material are indicated with the general indications printable material 201 and printed material 202. Directly downstream of the nozzle 502, the filament 321 with 3D printable material becomes, when deposited, layer 322 with 3D printed material 202.

Figure 1C:
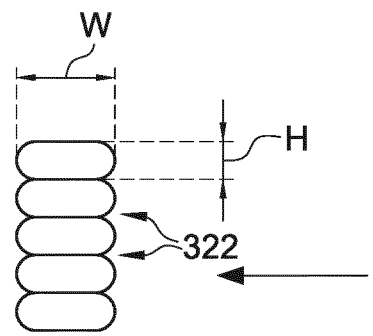

FIG. 1*c* schematically depicts a stack of 3D printed layers 322, each having a layer height H and a layer width W. Note that in embodiments the layer width and/or layer height may differ for two or more layers 322.

Referring to FIGS. 1*a*-1*c*, the filament of 3D printable material that is deposited leads to a layer having a height H (and width W). Depositing layer 322 after layer 322, the 3D item 1 is generated.

FIGS. 1*a*-1*c* show embodiments of amongst the method in general. FIGS. 2*a*-2*f* schematically depict some aspects in more detail, wherein the core-shell 3D printing is further schematically elucidated.

Figure 2A:
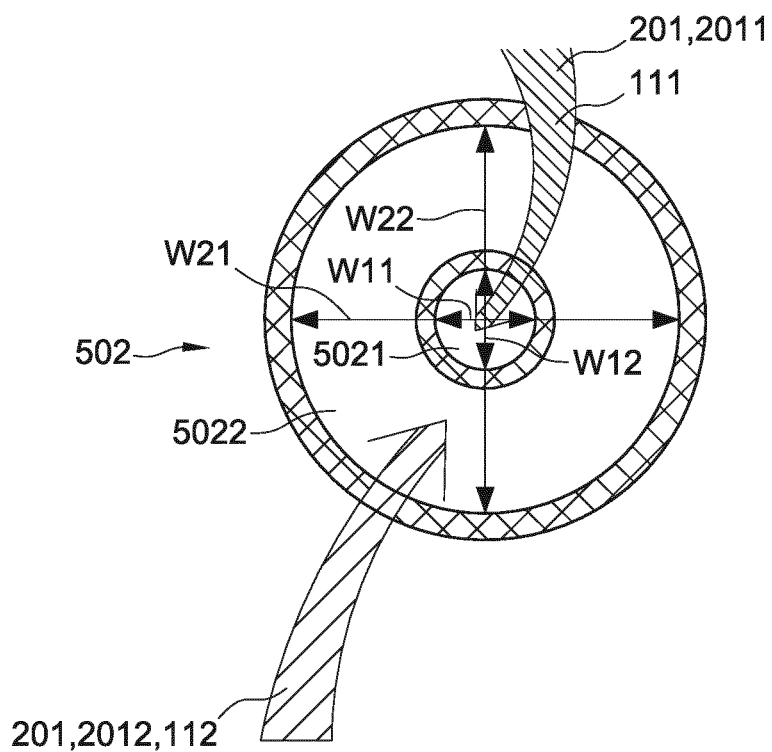
FIGS. 2a-2f schematically depict some aspects of the invention.
Figure 2B:
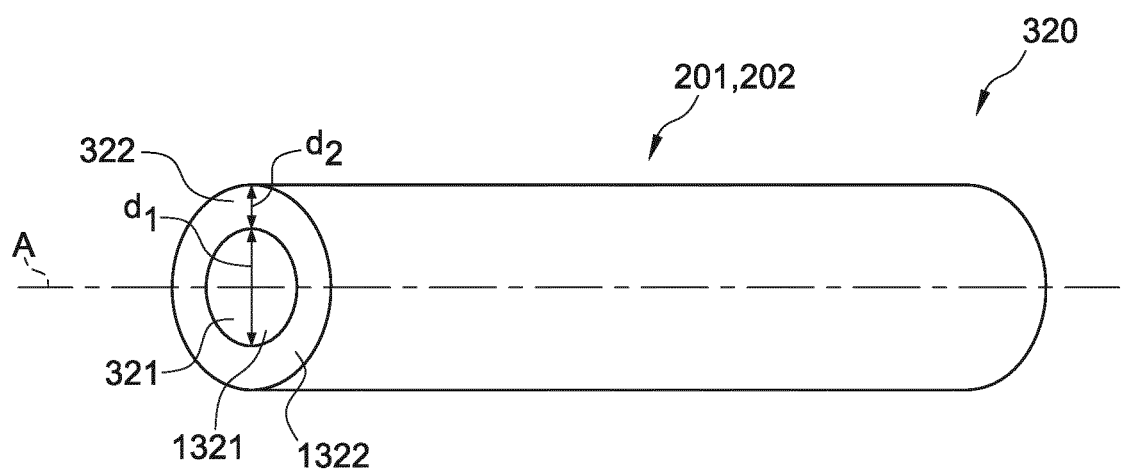
Figure 2C:
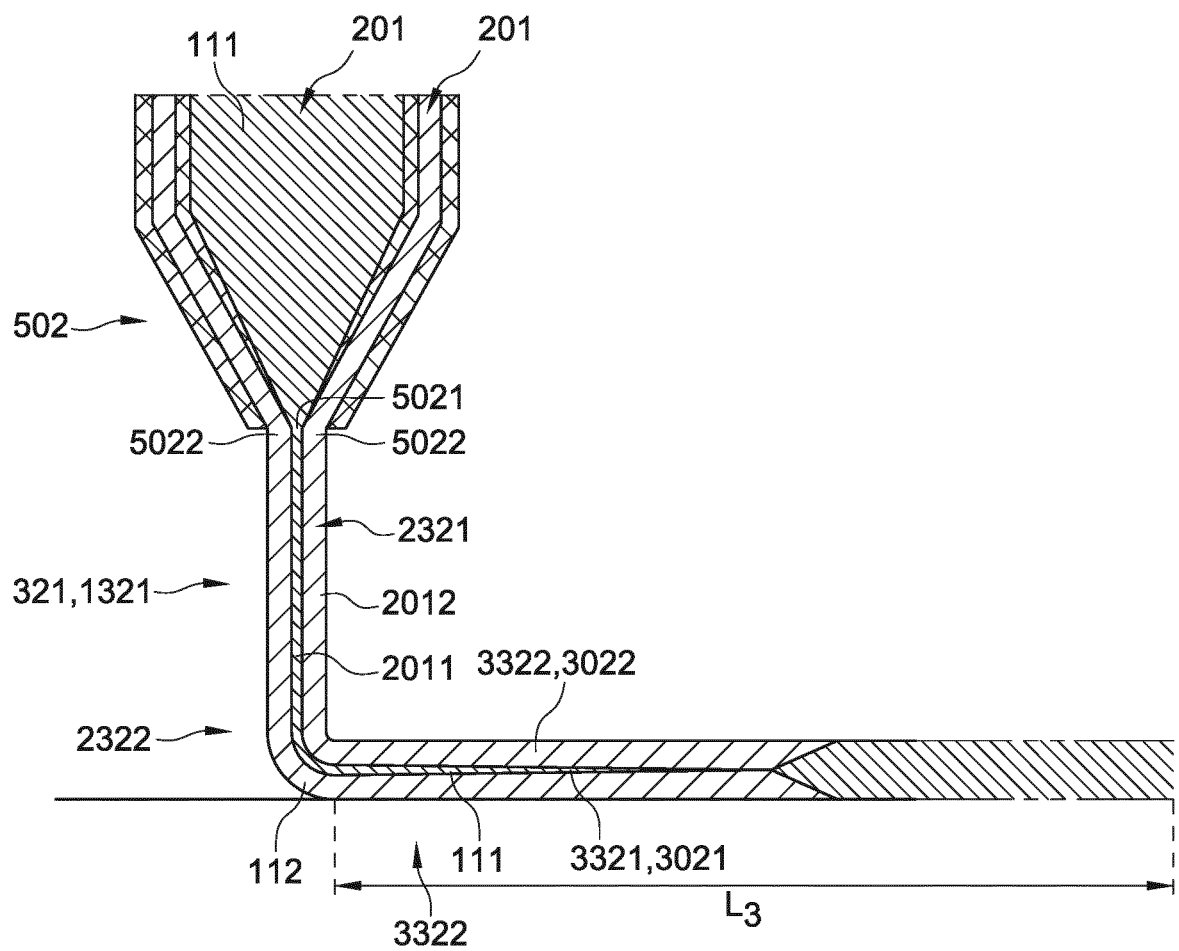
Figure 2D:
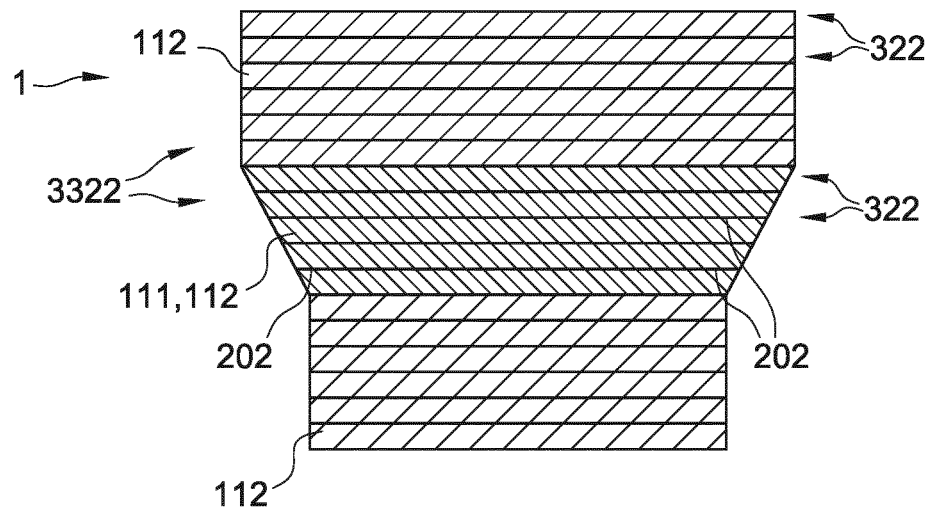
Figure 2E:
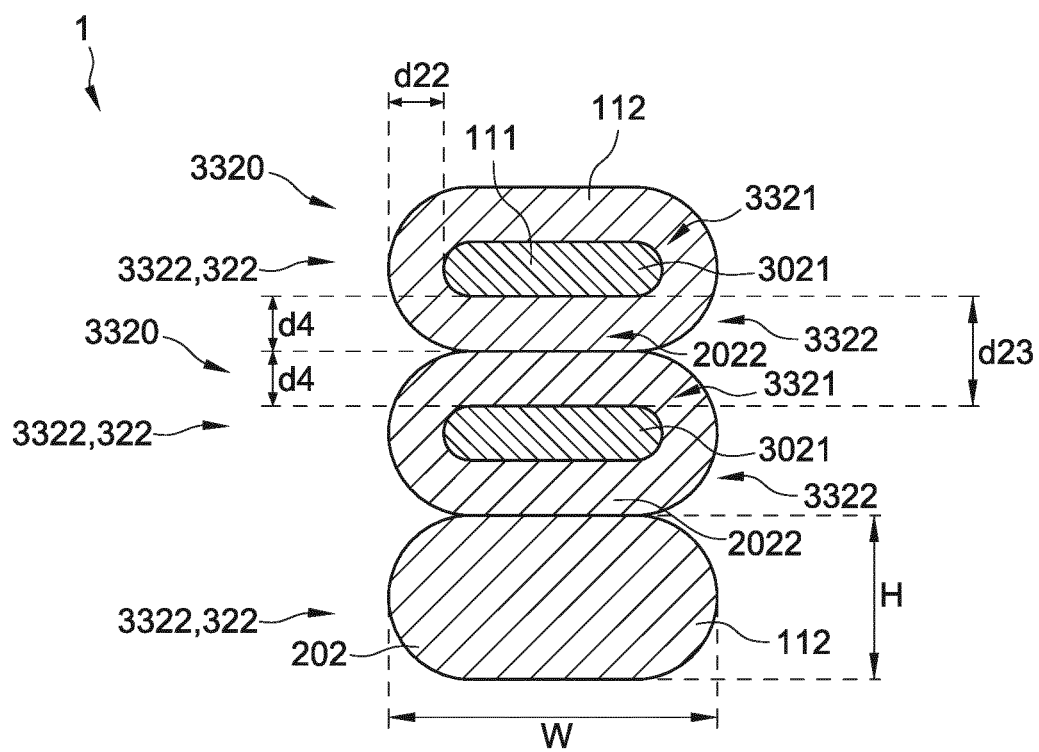
Figure 2F:
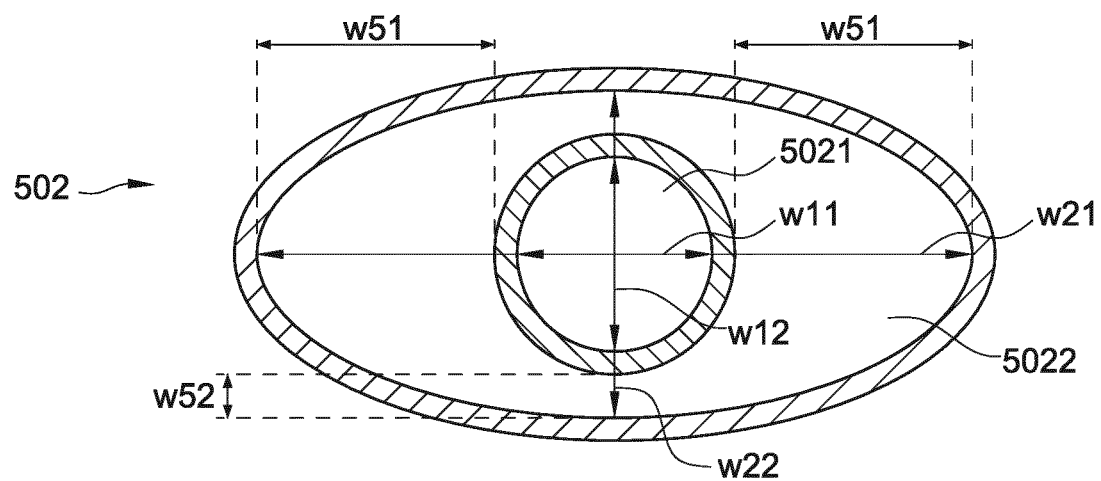

A core-shell nozzle 502 may be applied, see FIGS. 2*a*, 2*c* and 2*f*, wherein different 3D printable materials 201 may be introduced, to provide the 3D item 1 comprising 3D printed material 202, see FIG. 2*d*.

FIG. 2*a* schematically depicts an embodiment printer nozzle 502, wherein the printer nozzle 502 comprises a core feed nozzle 5021 and a shell feed nozzle 5022 configured for providing the core-shell extrudate, wherein the core feed nozzle 5021 has a largest core nozzle width w11 and a smallest core nozzle width w12, wherein the shell feed nozzle 5022 has a largest shell nozzle width w21 and a smallest core nozzle width w22. Here, w21=w22, w21>w11, w21>w12, and wherein w12=w11.

FIG. 2*b* schematically depicts an embodiment of a core-shell type filament 201, but this schematic drawing may also be used to shown an embodiment of a core-shell type extrudate 321. The extrudate 321, which is of the core-shell type is herein also indicated as core-shell extrudate 1321. The dimensions may differ between the filament and the extrudate. The core is indicated with reference 321, and comprises core material 1321.

The shell is indicated with reference 322, and comprises shell material 1322. The filament 320 shown may be printable 3D material 201, i.e. before depositing, or may refer to extrudate 321 escaping from the nozzle. Hence both reference 201 and 321 are applied. The core-shell filament 320 or extrudate 321 may in embodiments have a core diameter d1 selected from the range of 100-3000 µm. The shell thickness (d2) may be selected from the range of 100-2000 µm. In general, the shell thickness is smaller than the core diameter.

As schematically depicted in FIG. 2*c*, during at least part of the 3D printing stage the extrudate 321 comprises a core-shell extrudate 1321 comprising a core 2321 comprising a core material 2011, and a shell 2322 comprising a shell material 2012, wherein the core material 2011 and the shell material 2012 comprise different thermoplastic materials.

FIG. 2*c*-2*d* very schematically depict that in embodiments the method may further comprise controlling the relative amounts of the first thermoplastic material 111 and the second thermoplastic material 112 during the 3D printing stage. In FIG. 2*c* the core material 2011 downstream from the nozzle comprises the first thermoplastic material 111. From right to left, it appears that 3D printing was started with only the first thermoplastic material. Thereafter, only the second thermoplastic material was deposited. Since then, the core-shell extrudate 1321 was provided and deposited as core-shell 3D printed material 202. Hence, the method may further comprise providing during one or more time periods of the 3D printing stage the core-shell extrudate 1321 and providing during one or more other time periods of the 3D printing stage extrudate comprising one of the first thermoplastic material 111 and the second thermoplastic material 112. FIG. 2*d* schematically depicts some layers 202 of the second thermoplastic material 112, some core-shell layers 3322 with both the first thermoplastic material 111 and the second thermoplastic material, wherein one is comprised by the core and the other is comprised by the shell, and again some layers 202 of the second thermoplastic material 112. FIG. 2*e* schematically depict a lowest layer 202 of the second thermoplastic material 112, a two core-shell layers 3322 with both the first thermoplastic material 111 and the second thermoplastic material, wherein one is comprised by the core and the other is comprised by the shell.

In the top core-shell layer 3322 the first thermoplastic material 111 is comprised by the core 2321 and the second thermoplastic material is comprised by the shell 2322.

Hence, during one or more time periods of the 3D printing stage the core material 2011 comprises the first thermoplastic material 111 having the first glass transition temperature Tg1 of at maximum 0° C. and wherein the shell material 2012 comprises the second thermoplastic material having the second glass transition temperature Tg2 of at minimum 60° C., and/or during one or more time periods of the 3D printing stage the core material 2011 comprises the second thermoplastic material having the second glass transition temperature Tg2 of at minimum 60° C., and wherein the shell material 2012 comprises the first thermoplastic material 111 having the first glass transition temperature Tg1 of at maximum 0° C.

FIGS. 2d and 2e also schematically depict embodiments of a 3D item 1 comprising 3D printed material 202 wherein the 3D item 1 comprises a plurality of layers 322 of 3D printed material 202, wherein the plurality of layers 322 comprises one or more core-shell layer parts 3322, wherein each of the core-shell layer parts 3322 comprises a core 3321 comprising a core material 3021, and a shell 3322 comprising a shell material 3022, wherein the core material 3021 and the shell material 3022 comprise different thermoplastic materials selected from the group consisting of a first thermoplastic material 111 being an elastomeric material (having a first glass transition temperature Tg1 of at maximum 0° C.) and a second thermoplastic material 112 (having a second glass transition temperature Tg2 of at minimum 60° C.).

As shown in FIG. 2c, the relative amounts of the first thermoplastic material 111 and the second thermoplastic material 112 vary over a length L3 of one or more of the one or more core-shell layer parts 3322. This length L3 may be part of the layer or may be the entire layer. Further, as shown in FIGS. 2c), 2$_d$ and 2e, the plurality of layers 322 comprise one or more layer parts 3320 comprising one of the first thermoplastic material 111 and the second thermoplastic material 112.

Figure 3A:
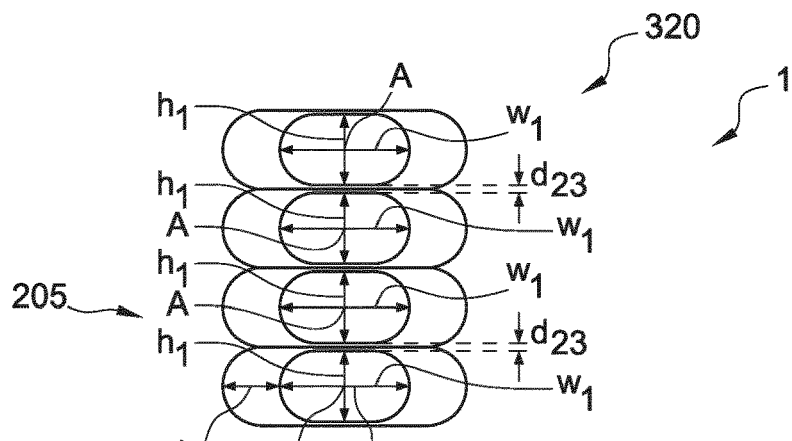
FIGS. 3a-3c schematically depicts some aspects in relation to deposited extrudate.
Figure 3B:
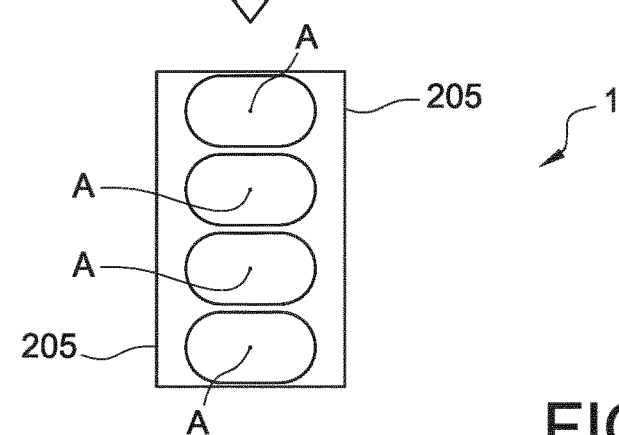
Figure 3C:
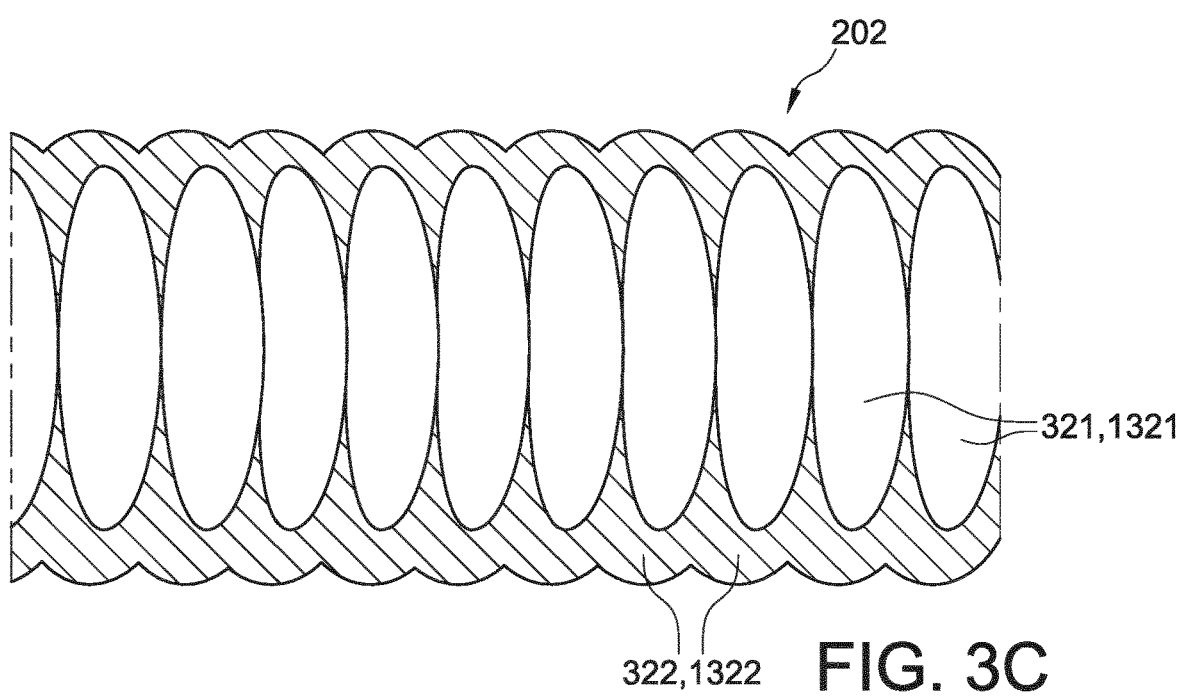

During exposure with a liquid that is solvent for the shell material, the thickness d22 may be reduced and a smoothening effect may occur (see also FIGS. 3a-3c).

FIG. 2f schematically depicts an embodiment wherein the printer nozzle 502 comprises a core feed nozzle 5021 and a shell feed nozzle 5022 configured for providing the core-shell extrudate 1321, wherein the core feed nozzle 5021 has a largest core nozzle width w11 and a smallest core nozzle width w12, wherein the shell feed nozzle 5022 has a largest shell nozzle width w21 and a smallest core nozzle width w22, wherein w21>w22, w21>w11, w21>w12, and wherein w12≥w11 (here w12=w11). Unlike the extrudate schematically depicted in FIG. 2b, this leads to an extrudate with a deformed or squeeze shape. The distances between the nozzles may be at minimum w52 and at maximum w51. Note that in such embodiments the shell thickness d2 of the extrudate downstream of the nozzle varies over the core, unlike the example in FIG. 2b (assuming to depict FIG. 2b an embodiment of an extrudate).

In FIG. 3a schematically the cross-section of a structure made of core shell layers is shown. Core and jacket materials can be chosen as described herein. The surface is indicated with reference 205. Exposing the 3D printed material, or at least part of its surface 205 to the solvent comprising liquid, leads to a smooth(er) surface structure as schematically shown in FIG. 3b. An example of a treated surface is shown in FIG. 3c and is also shown in FIG. 4.

Typically, the product is printed in one go, which means the core material is one long fiber which is embedded in a shell matrix.

Note that d23 may at some parts between adjacent layer cores 3321 may be essentially zero μm. Hence, at some parts adjacent layer cores 3321 may be in physical contact with each other (or may even form a single phase, as the core materials may be the same). The distance d23 may be formed by the shell layer thickness d4 of one of the adjacent layer cores 3321 and d4 of the other of the adjacent layer cores 3321.

Figure 4:
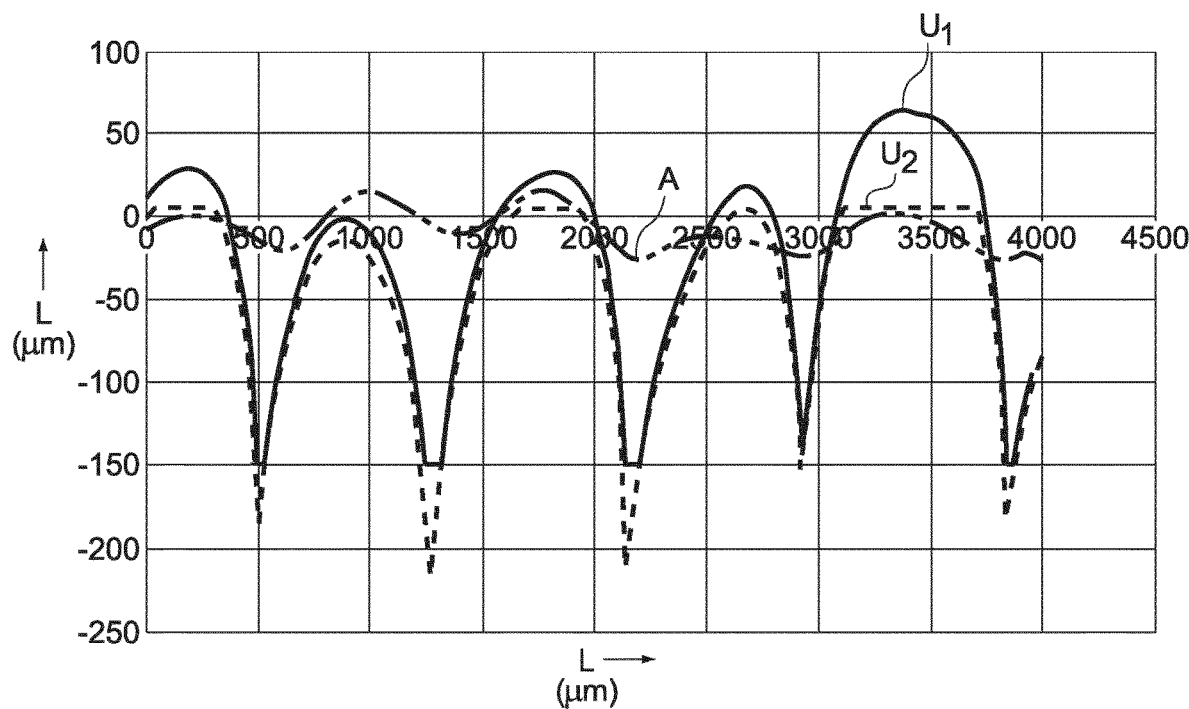
FIG. 4: shows a roughness measurement using DEKTAK of a two cross sections of an untreated (U1 and U2) and acetone treated (A) object made using a core shell nozzle with ABS in the shell and PP in the core with a layer thickness of 800 μm.

In FIG. 4 surface roughness of an object having a layer thickness of 800 μm (i.e. reference W in FIG. 2e), measured using a DEKTAK 6M surface profiler before and after the treatment with acetone is shown. In this figure, the surface roughness of a non-treated object (U1 and U2, which relate to different surface parts) is about 200 μm. After the treatment the surface roughness indicated by line A, i.e. after the treatment with acetone, shows that the roughness is reduced to about 30 μm. The item that was subjected to the acetone liquid showed less or no crack formation and essentially no delamination, neither deformation of the item. To obtain the object, polypropylene was used as core material and ABS jacket material to print a cylinder as object. Acetone was used as solvent for surface smoothing. Acetone is a solvent for ABS however it does not dissolve PP. During the treatment, the outer surface (ABS) is partly dissolved and smoothened as shown in 4 (and schematically shown in FIGS. 3b and 3c). Whereas the inner part PP is not affected, as acetone is a non-solvent for PP. As a result, the skeleton (PP) remained unaffected during the smoothening and no delamination or cracking was observed.

Figure 5:
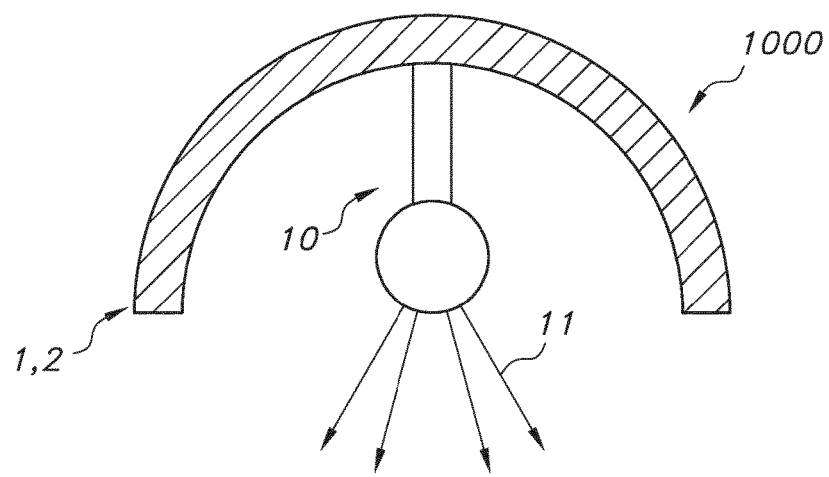
FIG. 5 schematically depicts an aspect of the invention. The schematic drawings are not necessarily to scale.

FIG. 5 schematically depicts an embodiment of a lamp or luminaire, indicated with reference 2, which comprises a light source 10 for generating light 11. The lamp may comprise a housing or shade or other element, which may comprise or be the 3D printed item 1.

Hence, the present invention may produce 3D structures with ribbon like internal structures but with a relative smooth surface, at least having a roughness much smaller than of the ribbon like internal structure.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention also provides a control system that may control the apparatus or device or system, or that may execute the herein described method or process. Yet further, the invention also provides a computer program product, when running on a computer which is functionally coupled to or comprised by the apparatus or device or system, controls one or more controllable elements of such apparatus or device or system.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for producing a 3D item by means of fused deposition modelling, the method comprising:
   a 3D printing stage comprising layer-wise depositing an extrudate comprising 3D printable material, wherein during at least part of the 3D printing stage the extrudate comprises a core-shell extrudate comprising a core comprising a core material, and a shell comprising a shell material, to provide the 3D item comprising 3D printed material, wherein the 3D item comprises a plurality of layers of 3D printed material, wherein one or more of layers comprises one or more core-shell layer parts, wherein each of the core-shell layer parts comprises a layer core comprising the core material, and a layer shell comprising the shell material, wherein the 3D item has an item surface defined by at least part of the 3D printed material;
   an exposure stage comprising exposing at least part of the item surface to a liquid, wherein the core material has core material solubility SC1 for the liquid and wherein the shell material has a shell material solubility SS1 for the liquid, wherein SC1<SS1, wherein:
   the core material comprises one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET); and
   the shell material comprises one or more of acrylonitrile butadiene styrene (ABS), poly(methyl methacrylate) (PMMA), polystyrene (PS), and styrene acrylic copolymers (SMMA).

2. The method according to claim 1, wherein the liquid comprises one or more of acetone and methyl ethyl ketone, and wherein the liquid is applied by one or more of flowing the liquid over at least part of the item surface, spraying the liquid to at least part of the item surface, exposing at least part of the item surface to a vapor comprising the liquid, and dipping at least part of the item surface in the liquid.

3. The method according to claim 1, wherein one or more of the item surface or the liquid during the exposure stage has a temperature of at maximum 40° C., and wherein $SC1/SS1 \leq 0.5$.

4. The method according to claim 1, wherein the layers have layer heights (H) and layer widths (W), wherein the layer heights (H) are smaller than the layer widths (W), wherein the method comprises providing during the printing stage the one or more of layers wherein the layer shell has a thickness that varies over a circumference of the layer core, wherein the thickness of the layer shell in height of a respective layer of the one or more layers is smaller than the thickness the layer shell in the width of the respective layer.

5. The method according to claim 1, wherein the core material has a higher viscosity than the shell material at a temperature where both the core material and the shell material are fluidic.

6. The method according to claim 1, wherein the layers have layer heights (H) and layer widths (W), wherein during the printing stage pressure is applied to the core-shell extrudate on a substrate to provide the layers of 3D printed material on the substrate with layer heights (H) smaller than the layer widths (W).

7. The method according to claim 1, further comprising using a printer nozzle, wherein the printer nozzle comprises a core feed nozzle and a shell feed nozzle configured for providing the core-shell extrudate, wherein the core feed nozzle has a largest core nozzle width (w11) and a smallest core nozzle width (w12), wherein the shell feed nozzle has a largest shell nozzle width (w21) and a smallest core nozzle width (w22), wherein w21>w22, w21>w11, w21>w12, and wherein w12>w11.

8. The method according to claim 7, the method comprising application of a fused deposition modeling 3D printer, comprising (a) the printer nozzle, and (b) a substrate, wherein the fused deposition modeling 3D printer is configured to provide the 3D printable material to the substrate, wherein the nozzle and substrate are configured rotatable relative to each other, and wherein the method further comprises maintaining the nozzle and the substrate in configuration such that the largest core nozzle width is configured perpendicular to a 3D printing direction during at least part of the printing stage.

9. The method according to claim 1, further comprising exposing at least part of the item surface to the liquid until a predetermined average surface roughness (Ra) of a surface of the 3D item is obtained, wherein the predetermined average surface roughness (Ra) is equal to or lower than 5 µm for an area of at least 25 mm$^2$.

\* \* \* \* \*